(12) United States Patent
Liao et al.

(10) Patent No.: US 10,896,220 B2
(45) Date of Patent: Jan. 19, 2021

(54) METHOD OF SEARCHING AN IMAGE FILE IN A COMPUTER SYSTEM, RELATED IMAGE FILE SEARCHING DEVICE, AND RELATED COMPUTER SYSTEM

(71) Applicant: AVISION INC., Hsinchu (TW)

(72) Inventors: Chun-Chieh Liao, Hsinchu (TW); Chun-Ping Huang, Hsinchu County (TW); Hung-Jen Lin, Hsinchu (TW)

(73) Assignee: AVISION INC., Hsinchu (TW)

( * ) Notice: Subject to any disclaimer, the term of this patent is extended or adjusted under 35 U.S.C. 154(b) by 170 days.

(21) Appl. No.: 15/925,719

(22) Filed: Mar. 19, 2018

(65) Prior Publication Data
US 2018/0341663 A1 Nov. 29, 2018

(30) Foreign Application Priority Data
May 26, 2017 (TW) .............................. 106117705 A

(51) Int. Cl.
*G06F 16/00* (2019.01)
*G06F 16/58* (2019.01)
*G06K 9/34* (2006.01)
*G06F 16/51* (2019.01)
(Continued)

(52) U.S. Cl.
CPC ........ *G06F 16/5866* (2019.01); *G06F 16/156* (2019.01); *G06F 16/51* (2019.01); *G06K 9/00* (2013.01); *G06K 9/34* (2013.01); *G06K 2209/01* (2013.01)

(58) Field of Classification Search
CPC .... G06F 16/5866; G06F 16/156; G06F 16/51; G06F 16/583; G06F 16/93; G06F 16/2477; G06F 16/532; G06F 16/2468; G06F 16/9535
See application file for complete search history.

(56) References Cited

U.S. PATENT DOCUMENTS

| 6,353,283 | B1 * | 3/2002 | Ghosh | ................... C03B 11/127 |
| | | | | 313/461 |
| 6,353,823 | B1 * | 3/2002 | Kumar | ..................... G06F 16/10 |
| 6,631,373 | B1 * | 10/2003 | Otani | ....................... G06F 16/81 |

(Continued)

FOREIGN PATENT DOCUMENTS

| CN | 1495647 A | 5/2004 |
| CN | 1790335 A | 6/2006 |

(Continued)

*Primary Examiner* — Daniel A Kuddus
(74) *Attorney, Agent, or Firm* — Winston Hsu

(57) ABSTRACT

A method of searching an image file includes: utilizing a login module to log in a user account; utilizing an input module to store an image file at a predetermined location; utilizing an information capturing module to capture at least one image information of the image file stored at the predetermined location; utilizing an index building module to build at least one index tag corresponding to the image file according to the at least one image information captured by the information capturing module; utilizing a searching module to receive at least one searching condition so as to search the at least one index tag according to the at least one searching condition; and utilizing a display module to display a searching result corresponding to the image file when the at least one index tag matches with the at least one searching condition.

17 Claims, 7 Drawing Sheets

(51) Int. Cl.
    *G06F 16/14*           (2019.01)
    *G06K 9/00*           (2006.01)

(56) References Cited

U.S. PATENT DOCUMENTS

| | | | |
|---|---|---|---|
| 6,633,893 B2 * | 10/2003 | Yahara | G06F 16/40 |
| 7,996,405 B2 * | 8/2011 | Shima | G06F 16/954 |
| | | | 707/738 |
| 9,286,360 B2 * | 3/2016 | Morimoto | G06F 16/54 |
| 9,576,008 B2 * | 2/2017 | Kataoka | G06F 16/2237 |
| 2003/0097377 A1 * | 5/2003 | Yahara | G06F 16/40 |
| 2005/0050028 A1 | 3/2005 | Rose | |
| 2005/0278624 A1 * | 12/2005 | Nishikawa | G06K 9/00442 |
| | | | 715/249 |
| 2007/0255695 A1 * | 11/2007 | Hu | G06F 16/58 |
| 2008/0235194 A1 * | 9/2008 | Shima | G06F 16/954 |
| 2014/0093175 A1 * | 4/2014 | Morimoto | G06F 16/54 |
| | | | 382/195 |
| 2014/0324878 A1 * | 10/2014 | Kataoka | G06F 16/319 |
| | | | 707/741 |
| 2014/0362235 A1 * | 12/2014 | Kishi | H04N 1/00244 |
| | | | 348/207.1 |
| 2015/0286687 A1 * | 10/2015 | Kuno | G06F 16/2477 |
| | | | 707/725 |
| 2016/0132534 A1 * | 5/2016 | Morimoto | G06F 16/54 |
| | | | 707/722 |
| 2016/0217158 A1 * | 7/2016 | Watanabe | G06F 16/532 |
| 2017/0300531 A1 * | 10/2017 | Poovananathan | G06F 16/248 |
| 2018/0084269 A1 * | 3/2018 | Qiu | H04N 19/423 |
| | | | 19/423 |

FOREIGN PATENT DOCUMENTS

| | | |
|---|---|---|
| CN | 1858747 A | 11/2006 |
| CN | 101340529 A | 1/2009 |
| CN | 101763367 A | 6/2010 |
| CN | 101996202 A | 3/2011 |
| CN | 102521392 A | 6/2012 |
| CN | 103632388 A | 3/2014 |
| CN | 104391878 A | 3/2015 |
| CN | 104572716 A | 4/2015 |
| CN | 104572905 A | 4/2015 |
| CN | 105260381 A | 1/2016 |
| CN | 105518678 A | 4/2016 |
| TW | I472936 B | 2/2015 |

\* cited by examiner

METHOD OF SEARCHING AN IMAGE FILE IN A COMPUTER SYSTEM, RELATED IMAGE FILE SEARCHING DEVICE, AND RELATED COMPUTER SYSTEM

BACKGROUND OF THE INVENTION

1. Field of the Invention

The present invention relates to a method of searching an image file, a related device and a related computer system, and more particularly, to a method of searching an image file in a computer system, a related image file searching device and a related computer system.

2. Description of the Prior Art

With the changes of lifestyles and the rise of environmental awareness, people use image files instead of paper to store different information. Currently, when managing a large number of image files, people usually store them in the corresponding folders by date or topic of a computer. When it is desired to search the image file in the computer, people have to open layers and layers of folders, which causes inconvenience of searching files. Furthermore, it also takes a lot of time to put the image files one by one in the corresponding folders by date or topic, which causes inconvenience of use.

SUMMARY OF THE INVENTION

Therefore, an objective of the present invention is to provide a method of searching an image file in a computer system, a related image file searching device and a related computer system for solving the aforementioned problems.

In order to achieve the aforementioned objective, the present invention discloses a method of searching an image file in a computer system. The method includes utilizing a login module of the computer system to log in a user account, utilizing an input module of the computer system to store an image file at a predetermined location, an information capturing module of the computer system capturing at least one image information of the image file stored at the predetermined location, an index building module of the computer system building at least one index tag corresponding to the image file according to the at least one image information captured by the information capturing module, utilizing a searching module of the computer system to receive at least one searching condition so as to search the at least one index tag according to the at least one searching condition, and a display module of the computer system displaying a searching result corresponding to the image file when the at least one index tag matches with the at least one searching condition.

According to an embodiment of the present invention, utilizing the input module of the computer system to store the image file at the predetermined location includes utilizing a scanning module to generate the image file to store the image file at the predetermined location.

According to an embodiment of the present invention, the at least one image information includes at least one character. The information capturing module of the computer system capturing the at least one image information of the image file stored at the predetermined location includes the information capturing module of the computer system capturing the at least one character of the image file by optical character recognition.

According to an embodiment of the present invention, the index building module of the computer system building the at least one index tag corresponding to the image file according to the at least one image information captured by the information capturing module includes the index building module of the computer system generating at least one keyword string corresponding to the at least one character according to the at least one character and building the at least one index tag according to the at least one keyword string.

According to an embodiment of the present invention, the at least one image information includes at least one graphic. The information capturing module of the computer system capturing the at least one image information of the image file stored at the predetermined location includes the information capturing module of the computer system capturing the at least one graphic of the image file by optical graphic recognition.

According to an embodiment of the present invention, the index building module of the computer system building the at least one index tag corresponding to the image file according to the at least one image information captured by the information capturing module includes the index building module of the computer system generating at least one keyword string corresponding to the at least one graphic according to the at least one graphic and building the at least one index tag according to the at least one keyword string.

According to an embodiment of the present invention, the information capturing module of the computer system capturing the at least one image information of the image file stored at the predetermined location includes the information capturing module capturing time information or location information of the image file stored at the predetermined location by the input module.

According to an embodiment of the present invention, the information capturing module of the computer system capturing the at least one image information of the image file stored at the predetermined location includes the information capturing module capturing exchangeable image file format information of the image file stored at the predetermined location.

According to an embodiment of the present invention, utilizing the input module of the computer system to store the image file at the predetermined location includes utilizing the input module of the computer system to remotely store the image file in a cloud server connected to the computer system.

According to an embodiment of the present invention, utilizing the input module of the computer system to store the image file at the predetermined location includes utilizing the input module of the computer system to store the image file in a local storage module of the computer system.

In order to achieve the aforementioned objective, the preset invention further discloses an image file searching device. The image file searching device includes a login module, an information capturing module, an index building module and a searching module. The login module is for logging in a user account. The information capturing module is for capturing at least one image information of an image file stored at a predetermined location when an input module of a computer system stores the image file at the predetermined location. The index building module is for building at least one index tag corresponding to the image file according to the at least one image information captured by the information capturing module. The searching module is for receiving at least one searching condition to search the at least one index tag according to the at least one searching condition, so as to generate a searching result corresponding to the image file.

According to an embodiment of the present invention, when the at least one index tag matches with the at least one searching condition, a display module of the computer system displays the searching result corresponding to the image file.

According to an embodiment of the present invention, the at least one image information includes at least one character, and the information capturing module captures the at least one character of the image file by optical character recognition.

According to an embodiment of the present invention, the index building module generates at least one keyword string corresponding to the at least one character according to the at least one character and further builds the at least one index tag according to the at least one keyword string.

According to an embodiment of the present invention, the at least one image information includes at least one graphic, and the information capturing module captures the at least one graphic of the image file by optical graphic recognition.

According to an embodiment of the present invention, the index building module generates at least one keyword string corresponding to the at least one graphic according to the at least one graphic and further builds the at least one index tag according to the at least one keyword string.

According to an embodiment of the present invention, the at least one image information includes time information or location information of the image file stored at the predetermined location by the input module.

According to an embodiment of the present invention, the at least one image information includes exchangeable image file format information.

According to an embodiment of the present invention, the input module is a scanning module, and the information capturing module captures the at least one image information of the image file scanned by the scanning module and stored at the predetermined location.

In order to achieve the aforementioned objective, the present invention further discloses a computer system. The computer system includes an input module, an image file searching device and a display module. The input module is for storing an image file at a predetermined location. The image file searching device is for searching the image file. The image file searching device includes a login module, an information capturing module, an index building module and a searching module. The login module is for logging in a user account. The information capturing module is for capturing at least one image information of the image file stored at the predetermined location when the input module stores the image file at the predetermined location. The index building module is for building at least one index tag corresponding to the image file according to the at least one image information captured by the information capturing module. The searching module is for receiving at least one searching condition so as to search the at least one index tag according to the at least one searching condition. The display module is for displaying a searching result corresponding to the image file when the at least one index tag matches with the at least one searching condition.

According to an embodiment of the present invention, the input module is a scanning module for scanning the image file to store the image file at the predetermined location.

According to an embodiment of the present invention, the at least one image information includes at least one character, and the information capturing module captures the at least one character of the image file by optical character recognition.

According to an embodiment of the present invention, the index building module generates at least one keyword string corresponding to the at least one character according to the at least one character and further builds the at least one index tag according to the at least one keyword string.

According to an embodiment of the present invention, the at least one image information includes at least one graphic, and the information capturing module captures the at least one graphic of the image file by optical graphic recognition.

According to an embodiment of the present invention, the index building module generates at least one keyword string corresponding to the at least one graphic according to the at least one graphic and further builds the at least one index tag according to the at least one keyword string.

According to an embodiment of the present invention, the at least one image information includes time information or location information of the image file stored at the predetermined location by the input module.

According to an embodiment of the present invention, the at least one image information includes exchangeable image file format information.

According to an embodiment of the present invention, the input module remotely stores the image file in a cloud server connected to the computer system.

According to an embodiment of the present invention, the computer system further includes a local storage module, and the input module stores the image file in the local storage module.

In summary, the present invention utilizes the information capturing module for capturing the image information of the image file when the input module stores the image file at the predetermined location and further utilizes the index building module for building the index tag corresponding to the image file according to the image information captured by the information capturing module. In such a way, as long as a user inputs the searching condition to search the index tag by the searching module, the image file, which has the index tag matching with the searching condition, can be sorted out in a short time. Therefore, it is not required to classify the image file in advance. Furthermore, when it is desired to find the image file, it does not have to open layers and layers of folders anymore, which brings convenience of use.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
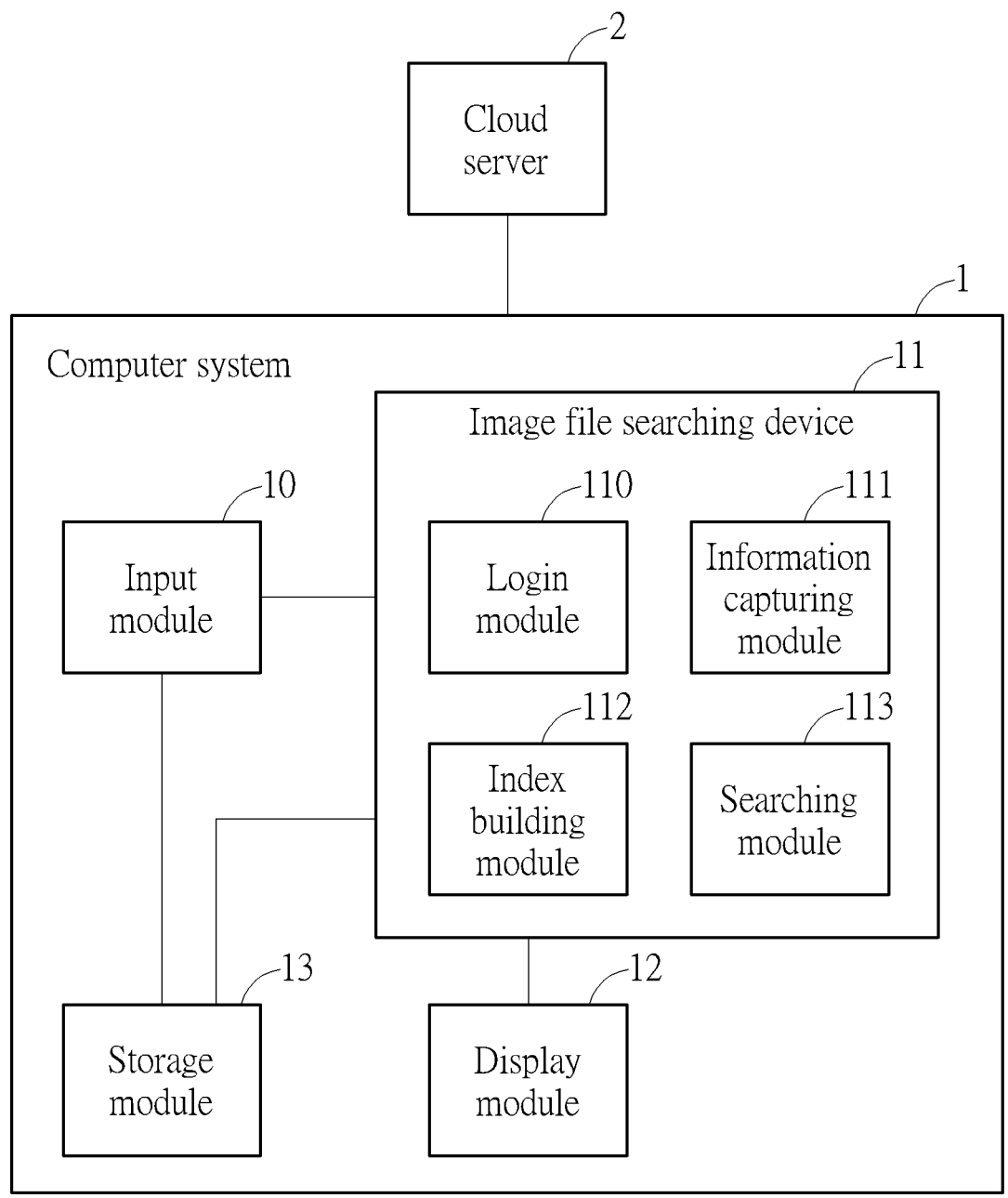
FIG. 1 is a functional block diagram of a computer system according to an embodiment of the present invention.

Please refer to FIG. 1. FIG. 1 is a functional block diagram of a computer system 1 according to an embodiment of the present invention. As shown in FIG. 1, the computer system 1 includes an input module 10, an image file searching device 11 and a display module 12. The input module 10 is for storing an image file at a predetermined location. The image file searching device 11 is for searching the image file. The display module 12 is for displaying a searching result of the image file searching device 11. In this embodiment, the input module 10 can be a scanning module, such as a scanner, for scanning an image file to store the image file at a predetermined location. The image file searching device 11 can be implemented by a combination of a processor and a storage media storing a program which can provide a user interface for allowing users to search the image file with a method of searching the image file of the present invention. The storage media can be a floppy disc, a compact disc, a hard disc, or any other storage media which can be read and written by machine. The display module 12 can be a monitor for displaying the aforementioned data processing information. However, the input module 10, the image file searching device 11 and the display module 12 are not limited to this embodiment. Software, hardware or firmware which can accomplish the aforementioned functions is included within the scope of the present invention. For example, in another embodiment, the input module 10 can be a data input interface, e.g., one of various kinds of connecting interfaces, for receiving the image file transmitted from an external electronic device to store the image file at the predetermined location. Alternatively, in another embodiment, the input module 10 can be software installed on the computer system 1 for creating and receiving the image file to store the image file at the predetermined location.

Furthermore, the image file searching device 11 includes a login module 110, an information capturing module 111, an index building module 112 and a searching module 113. The login module 110 is for allowing a user to log in a user account. The information capturing module 111 is for capturing at least one image information of an image file stored at a predetermined location when the input module 10 stores the image file at the predetermined location. The index building module 112 is for building at least one index tag corresponding to the image file according to the at least one image information captured by the information capturing module 111. The searching module 113 is for receiving at least one searching condition so as to search the at least one index tag according to the at least one searching condition. The display module 12 is for displaying a searching result corresponding to the image file when the at least one index tag matches with the at least one searching condition. In this embodiment, the login module 110, the information capturing module 111, the index building module 112 and the searching module 113 can be implemented by software programs stored in the storage media and executed by the processor to perform the corresponding operation. However, it is not limited to this embodiment. For example, in another embodiment, each of the login module 110, the information capturing module 111, the index building module 112 and the searching module 113 can be an Application-specific integrated circuit.

Figure 2:
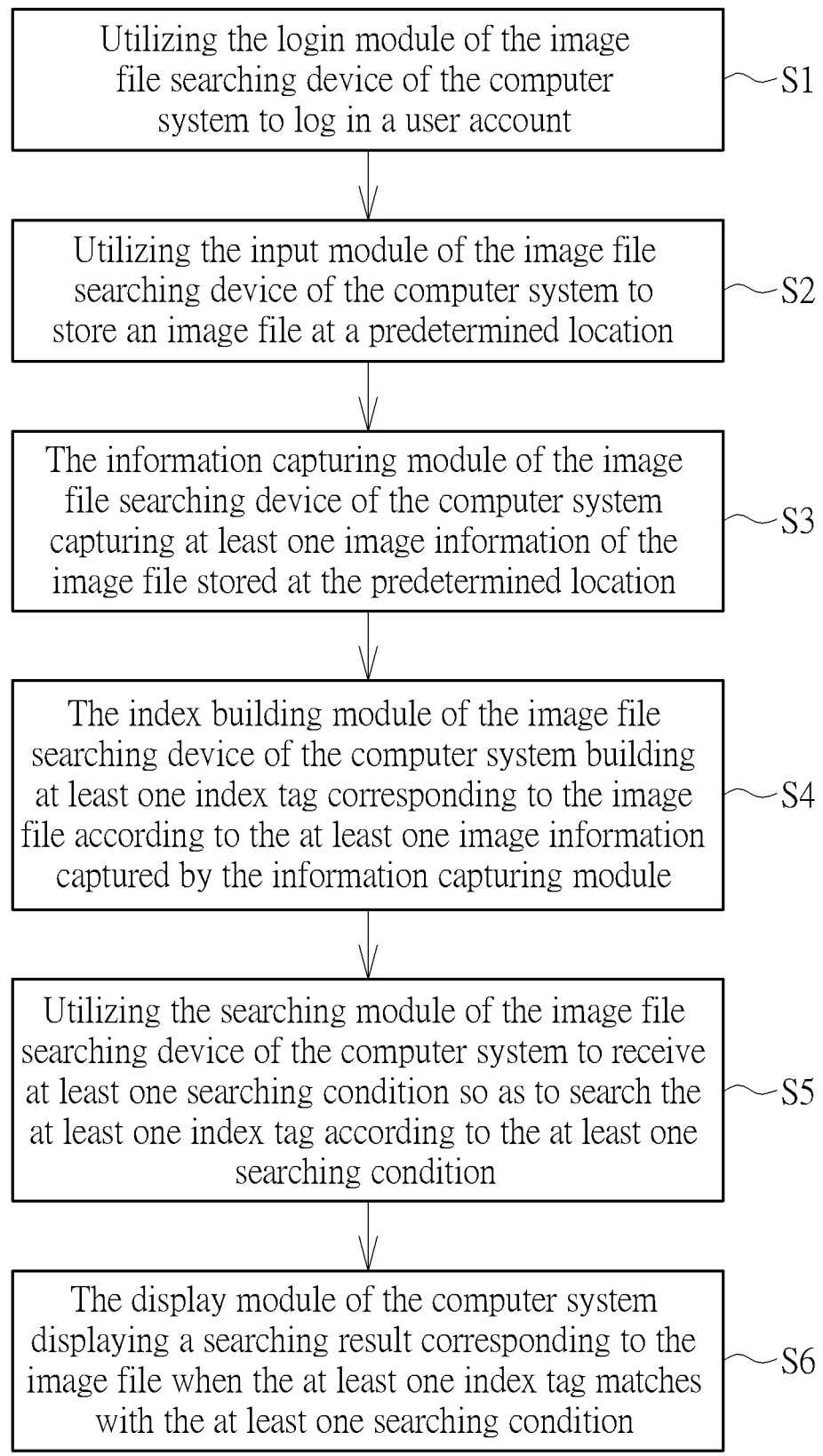
FIG. 2 is a flowchart diagram of a method of searching an image file according to the embodiment of the present invention.

Please refer to FIG. 2 to FIG. 7. FIG. 2 is a flow chart diagram of a method of searching an image file according to the embodiment of the present invention. FIG. 3 to FIG. 7 are diagrams of a screenshot of the display module 12 as the image file searching device 11 executes different steps according to the embodiment of the present invention. As shown in FIG. 2, the method includes the following steps:

S1: utilizing the login module 110 of the image file searching device 11 of the computer system 1 to log in a user account;

S2: utilizing the input module 10 of the image file searching device 11 of the computer system 1 to store an image file at a predetermined location;

S3: the information capturing module 111 of the image file searching device 11 of the computer system 1 capturing at least one image information of the image file stored at the predetermined location;

S4: the index building module 112 of the image file searching device 11 of the computer system 1 building at least one index tag corresponding to the image file according to the at least one image information captured by the information capturing module 111;

S5: utilizing the searching module 113 of the image file searching device 11 of the computer system 1 to receive at least one searching condition so as to search the at least one index tag according to the at least one searching condition; and S6: the display module 12 of the computer system 1 displaying a searching result corresponding to the image file when the at least one index tag matches with the at least one searching condition.

Figure 3:
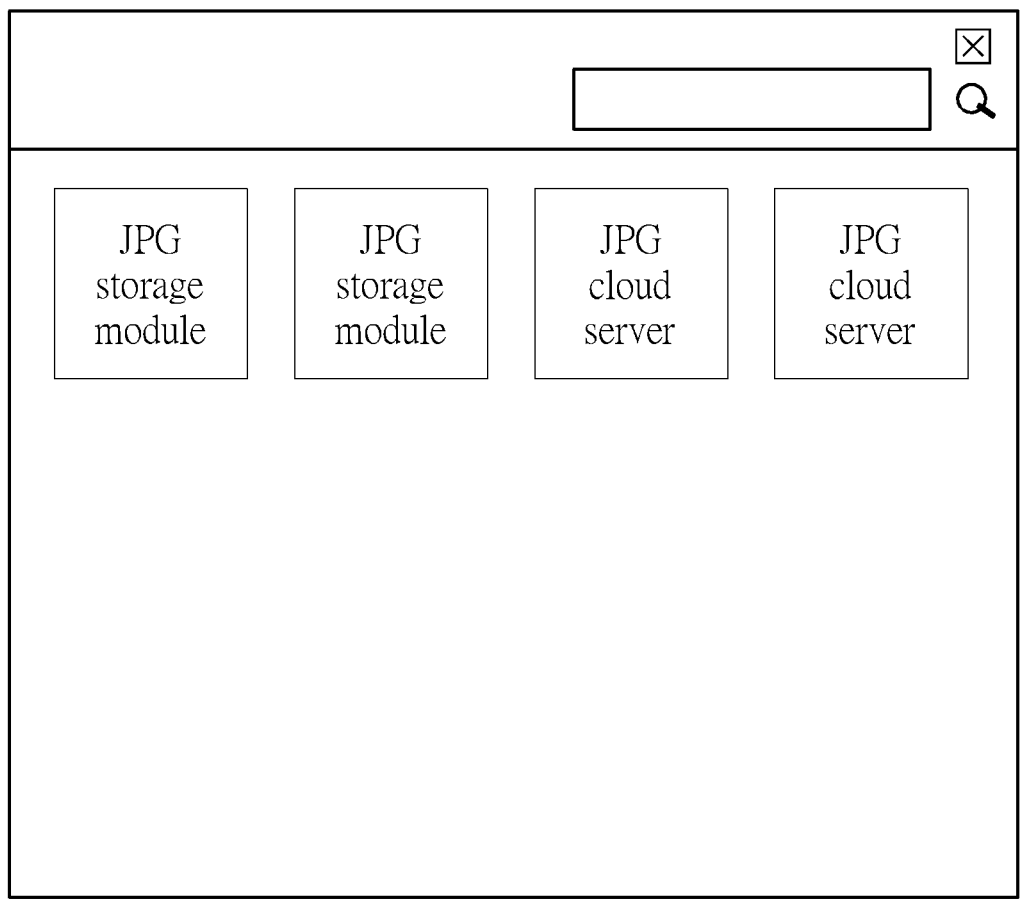
FIG. 3 to FIG. 7 are diagrams of a screenshot of a display module as an image file searching device executes different steps according to the embodiment of the present invention.

Detailed description for the steps of the method is provided as follows. First of all, as mentioned in step S1, when users log in the computer system 1 with different user accounts, the login module 110 can log in the image file searching device 11 with the corresponding user's authorization and load the corresponding user's setting, so as to protect user privacy and prevent the image file from revealing. Afterwards, as mentioned in step S2, the input module 10 can store an image file at a predetermined location. In this embodiment, the input module 10 can be a scanning module, such as a scanner, for scanning an image document to generate a corresponding scanned image file to store the scanned image file at a predetermined location. Furthermore, in the present invention, the input module 10 can store the image file in a specific format according to the users' demands, and the predetermined location can be a local host, i.e., the computer system, or a remote host. For example, as shown in FIG. 1 and FIG. 3, the computer system 1 can further be connected to a cloud server 2 and include a storage module 13. In this embodiment, the cloud server 2 can have a cloud storage, and the storage module 13 can be an internal storage apparatus of the computer system, such as a hard disc or a memory. The users can control the input module 10 to store the image file at the storage module 13 or the cloud server 2 in JPG or PDF format according to their demands. The image file searching device 11 can search the targeted image file from plenty of image files stored at the cloud server 2 or/and the storage module 13. Besides, in this embodiment, the users can control the input module 10 to abort during a process that the input module 10 stores the image file at the predetermined location.

Figure 4:
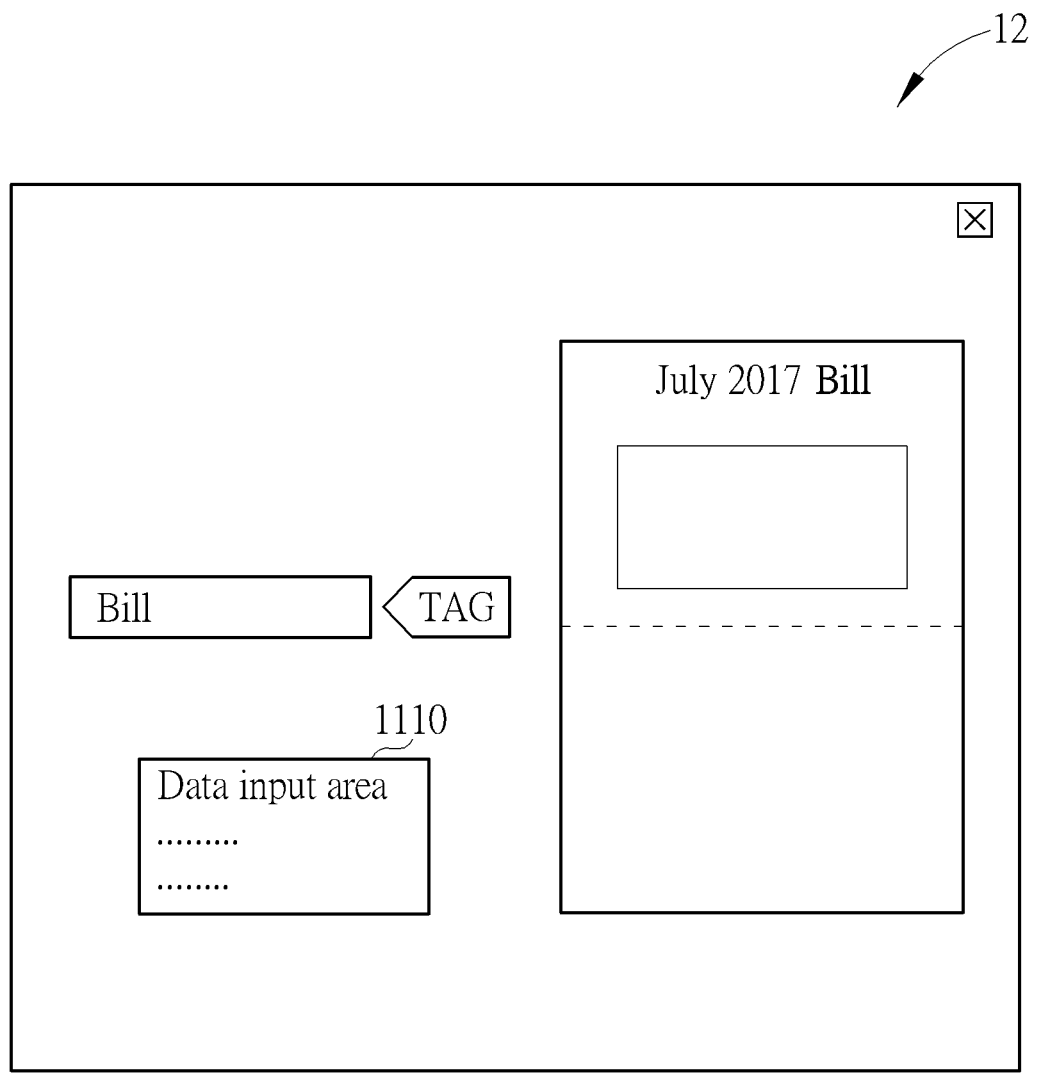

Afterwards, as mentioned in steps S3 and S4, when the input module 10 stores the image file at the predetermined location, the information capturing module 111 can automatically capture at least one image information of the image file stored at the predetermined location. The index building module 112 can build at least one index tag corresponding to the image file according to the at least one image information captured by the information capturing module 111. The at least one image information of the present invention is not limited to any form. For example, as shown in FIG. 4, the at least one image information of the image file can at least include at least one character. If the at least one image information include at least one character, the information capturing module 111 can capture the at least one character of the image file by optical character recognition. The index building module 112 generates at least one keyword string corresponding to the at least one character according to the at least one character and builds the at least one index tag according to the at least one keyword string. For example, when the information capturing module 111 captures characters of "July 2017 Bill", the index building module 112 can generate the keyword string of "Bill" and build the index tag corresponding to the keyword string of "Bill". Furthermore, as shown in FIG. 4, the display module 12 also can further include a data input area 1110 for inputting remarks corresponding to the image file.

Figure 5:
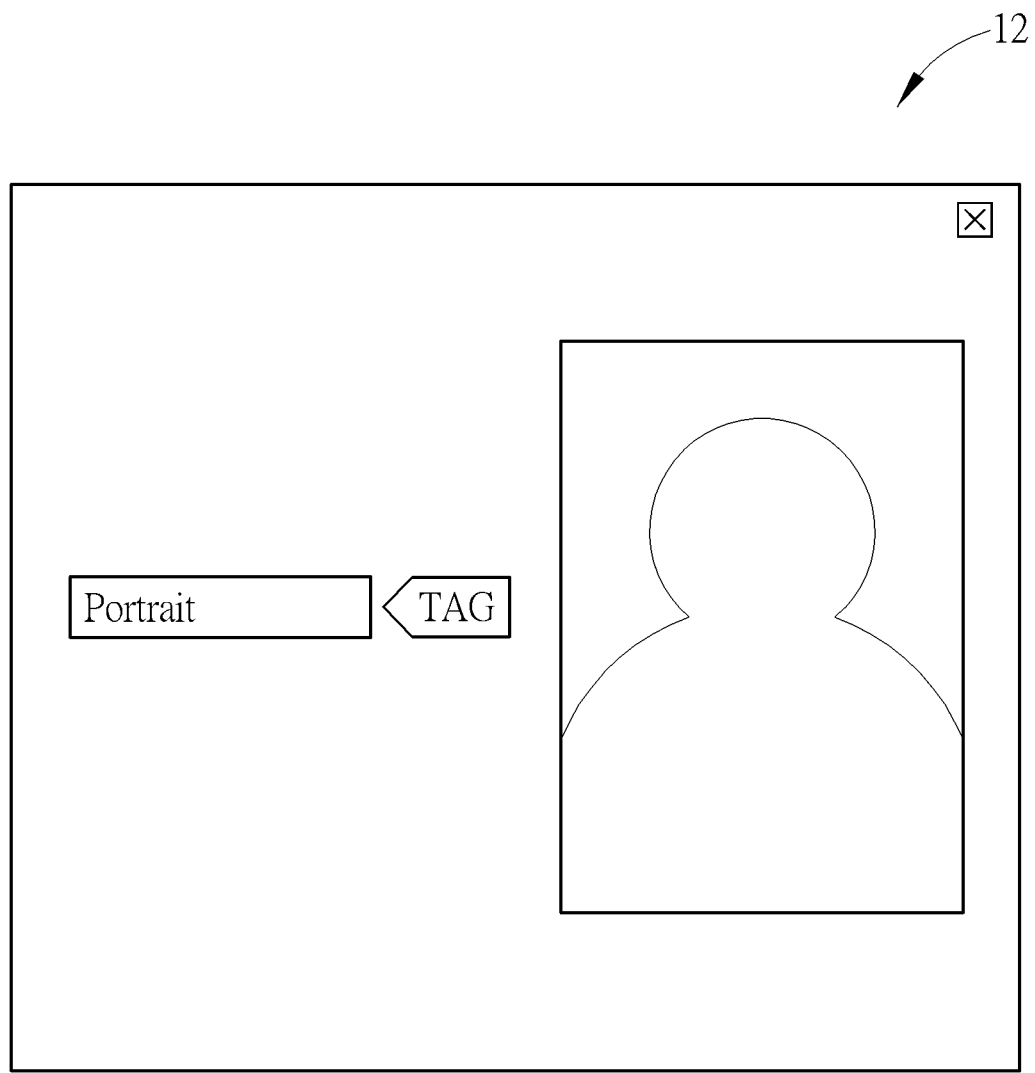
Figure 6:
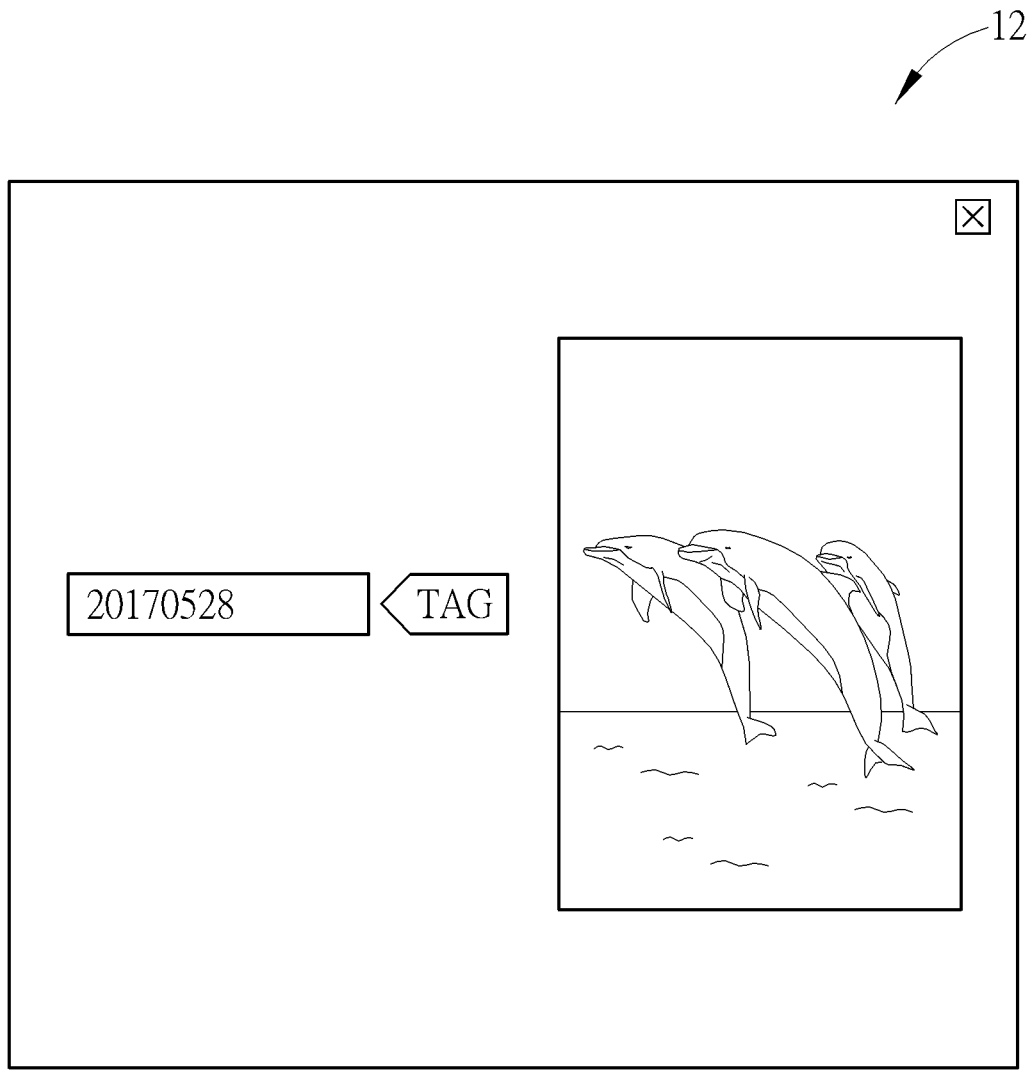

In another embodiment, as shown in FIG. 5, the at least one image information includes at least one graphic, the information capturing module 111 can capture the at least one graphic of the image file by optical graphic recognition. The index building module 112 can generate at least one keyword string corresponding to the at least one graphic according to the at least one graphic and builds the at least one index tag according to the at least one keyword string. For example, when the information capturing module 111 captures a graphic of a portrait, the index building module 112 can generate the keyword string of "Portrait" and build the index tag corresponding to the keyword string of "Portrait". Furthermore, as shown in FIG. 6, if the image file is a digital photo file, the at least one image information also can at least include time information or location information of the image file stored at the predetermined location or exchangeable image file format information. The index building module 112 can build the at least one index tag according to the time information, the location information or the exchangeable image file format information captured by the information capturing module 111. For example, the at least one image information includes time information of "20170528". The index building module 112 can build the index tag corresponding to the time information of "20170528".

Figure 7:
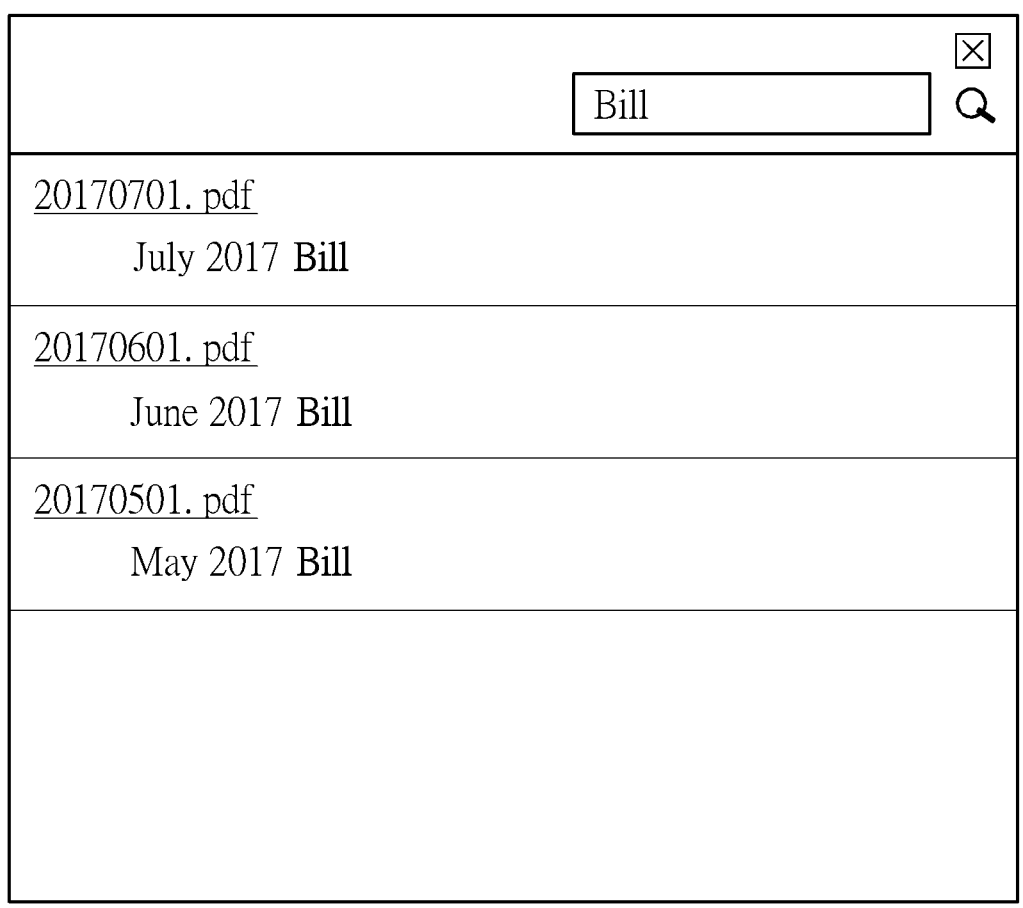

As mentioned in steps S5 and S6, after the index building module 112 builds the at least one index tag corresponding to the image file according to the at least one image information captured by the information capturing module 111, the users can utilize the searching module 113 to input at least one searching condition corresponding to the image file, so as to search the image file. The searching module 113 can search the at least one index tag and the remarks according to the at least one searching condition. When the at least one index tag or the remarks of the image file matches the searching condition, the display module 12 displays a searching result corresponding to the image file, which allows the users to search the image file easily. For example, as shown in FIG. 7, when it is desired to search the image file related to a bill, the users only have to utilize the searching module 113 to input "Bill" as the searching condition. All image files which have the index tag or the remarks matching with the searching condition of "Bill" can be sorted out and listed in the searching result. At this moment, the users can search the targeted image file from the searching result easily. Besides, when it is desired to search the image file related to a portrait or a landscape, the users only have to input the corresponding searching condition, such as personnel information, the time information or the location information. The image file which has the corresponding index tag can be listed in the searching result. The operational principle is the same as the aforementioned one. Detail description is omitted herein for simplicity.

In summary, the present invention utilizes the information capturing module for capturing the image information of the image file when the input module stores the image file at the predetermined location and further utilizes the index building module for building the index tag corresponding to the image file according to the image information captured by the information capturing module. In such a way, as long as a user inputs the searching condition to search the index tag by the searching module, the image file, which has the index tag matching with the searching condition, can be sorted out in a short time. Therefore, it is not required to classify the image file in advance. Furthermore, when it is desired to find the image file, it does not have to open layers and layers of folders anymore, which brings convenience of use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of searching an image file in a computer system comprising:

utilizing a login module of the computer system to log in a user account;

utilizing an input module of the computer system to store an image file at a predetermined location;

utilizing an information capturing module of the computer system to capture and recognize at least one character of a textual component displayed in at least one image information of the image file stored at the predetermined location;

utilizing an index building module of the computer system to generate at least one keyword string corresponding to the at least one character according to the at least one character and to build at least one index tag corresponding to the image file according to the at least one keyword string corresponding to the at least one character of the textual component displayed in the at least one image information captured and recognized by the information capturing module;

utilizing a searching module of the computer system to receive at least one searching condition and to search the at least one index tag according to the at least one searching condition; and utilizing a display module of the computer system to display a searching result corresponding to the image file when the at least one index tag matches with the at least one searching condition.

2. The method of claim 1, wherein utilizing the input module of the computer system to store the image file at the predetermined location comprises:

utilizing a scanning module to generate the image file to store the image file at the predetermined location.

3. The method of claim 1, wherein utilizing the information capturing module of the computer system to capture and recognize the at least one character of the textual component displayed in the at least one image information of the image file stored at the predetermined location comprises:

utilizing the information capturing module of the computer system to capture and recognize the at least one character of the image file by optical character recognition.

4. The method of claim 1, wherein the at least one image information further comprises at least one graphic, and the method further comprises:

utilizing the information capturing module of the computer system to capture the at least one graphic of the image file by optical graphic recognition.

5. The method of claim 4, wherein the method further comprises:

utilizing the index building module of the computer system to generate the at least one keyword string corresponding to the at least one graphic according to the at least one graphic and to build the at least one index tag according to the at least one keyword string.

6. The method of claim 1, wherein the method further comprises:

utilizing the information capturing module to capture time information or location information of the image file stored at the predetermined location by the input module.

7. An image file searching device comprising:

a login module for logging in a user account;

an information capturing module for capturing and recognizing at least one character of a textual component displayed in at least one image information of an image file stored at a predetermined location when an input module of a computer system stores the image file at the predetermined location;

an index building module for generating at least one keyword string corresponding to the at least one character according to the at least one character and building at least one index tag corresponding to the image file according to the at least one keyword string corresponding to the at least one character of the textual component displayed in the at least one image information captured and recognized by the information capturing module;

a searching module for receiving at least one searching condition to search the at least one index tag according to the at least one searching condition and generating a searching result corresponding to the image file; and a hardware processor for executing operation of the login module, the information capturing module, the index building module and the searching module.

8. The image file searching device of claim 7, wherein when the at least one index tag matches with the at least one searching condition, a display module of the computer system displays the searching result corresponding to the image file.

9. The image file searching device of claim 7, wherein the information capturing module captures and recognizes the at least one character of the image file by optical character recognition.

10. The image file searching device of claim 7, wherein the at least one image information further comprises at least one graphic, and the information capturing module captures the at least one graphic of the image file by optical graphic recognition.

11. The image file searching device of claim 10, wherein the index building module generates the at least one keyword string corresponding to the at least one graphic according to the at least one graphic and builds the at least one index tag according to the at least one keyword string.

12. A computer system comprising:

an input module for storing an image file at a predetermined location;

an image file searching device for searching the image file, the image file searching device comprising:

a login module for logging in a user account;

an information capturing module for capturing and recognizing at least one character of a textual component displayed in at least one image information of the image file stored at the predetermined location when the input module stores the image file at the predetermined location;

an index building module for generating at least one keyword string corresponding to the at least one character according to the at least one character and building at least one index tag corresponding to the image file according to the at least one keyword string corresponding to the at least one character of the textual component displayed in the at least one image information captured and recognized by the information capturing module; and a searching module for receiving at least one searching condition and searching the at least one index tag according to the at least one searching condition; and a hardware processor for executing operation of the login module, the information capturing module, the index building module and the searching module; and a display module for displaying a searching result corresponding to the image file when the at least one index tag matches with the at least one searching condition.

13. The computer system of claim 12, wherein the input module is a scanning module for scanning the image file to store the image file at the predetermined location.

14. The computer system of claim 12, wherein the information capturing module captures and recognizes the at least one character of the image file by optical character recognition.

15. The computer system of claim 12, wherein the at least one image information further comprises at least one graphic, and the information capturing module captures the at least one graphic of the image file by optical graphic recognition.

16. The computer system of claim 15, wherein the index building module generates the at least one keyword string corresponding to the at least one graphic according to the at least one graphic and builds the at least one index tag according to the at least one keyword string.

17. The computer system of claim 12, wherein the at least one image information further comprises time information or location information of the image file stored at the predetermined location by the input module, and the information capturing module captures the time information or the location information of the image file stored at the predetermined location by the input module.

* * * * *